United States Patent
Izumikawa et al.

(12) 
(10) Patent No.: US 6,416,726 B2
(45) Date of Patent: Jul. 9, 2002

(54) METHOD FOR DECOMPOSING NITROGEN FLUORIDE OR SULFUR FLUORIDE AND DECOMPOSING REAGENT USED THEREFOR

(75) Inventors: Chiaki Izumikawa, Tokyo; Kazumasa Tezuka; Kazuto Ito, both of Okayama; Hitoshi Atobe; Toraichi Kaneko, both of Kawasaki, all of (JP)

(73) Assignees: Showa Denko K.K.; Dowa Mining Co., Ltd., both of Tokyo; Dowa Iron Powder Co., Ltd., Okayama, all of (JP)

(*) Notice: Subject to any disclaimer, the term of this patent is extended or adjusted under 35 U.S.C. 154(b) by 0 days.

(21) Appl. No.: 09/770,402

(22) Filed: Jan. 29, 2001

Related U.S. Application Data

(62) Division of application No. 09/129,841, filed on Aug. 6, 1998, now abandoned.

(30) Foreign Application Priority Data

Aug. 7, 1997 (JP) ............................................. 9-225723
Aug. 7, 1997 (JP) ............................................. 9-225851

(51) Int. Cl.[7] .......................... B01D 53/68; B01D 53/70; B01D 53/34; C01B 7/19
(52) U.S. Cl. ................................ 423/240 S; 423/242.1; 588/246; 588/248; 252/181.7
(58) Field of Search .......................... 252/181.2, 181.6, 252/181.7, 189, 190, 192, 193; 423/230, 225, 240 S, 242.1; 588/246, 248

(56) References Cited

U.S. PATENT DOCUMENTS

| 4,049,399 A | * | 9/1977 | Teller .............................. 55/73 |
| 4,532,115 A | * | 7/1985 | Nishino et al. .............. 423/210 |
| 4,594,231 A | * | 6/1986 | Nishino et al. .............. 423/210 |
| 5,322,674 A | * | 6/1994 | Mori ....................... 423/240 S |
| 5,817,284 A | * | 10/1998 | Nakano et al. ........... 423/240 S |

FOREIGN PATENT DOCUMENTS

| EP | 0 121 339 A | 10/1984 |
| EP | 0771 579 A | 5/1997 |
| JP | 6-293501 | 10/1994 |
| JP | 7-24255 | 1/1995 |
| JP | 8-187302 | 7/1996 |
| JP | 9-122442 | 5/1997 |
| JP | 10-28839 | 2/1998 |

OTHER PUBLICATIONS

XP–002093101 (JP 5–15740A) Database WPI, Section Ch, Week 9309, Derwent Publications Ltd. Jan. 26, 1993.

* cited by examiner

Primary Examiner—Joseph D. Anthony
(74) Attorney, Agent, or Firm—Sughrue Mion, PLLC

(57) ABSTRACT

A method for decomposing nitrogen fluoride or sulfur fluoride, comprising contacting gaseous nitrogen fluoride or sulfur fluoride with a solid reagent comprising elemental carbon, one or more of the alkaline earth metal elements and optionally one or more of the alkali metal elements, to fix the fluorine component in the nitrogen fluoride or sulfur fluoride in said reagent.

13 Claims, 4 Drawing Sheets

METHOD FOR DECOMPOSING NITROGEN FLUORIDE OR SULFUR FLUORIDE AND DECOMPOSING REAGENT USED THEREFOR

This is a divisional of application Ser. No. 09/129,841 filed Aug. 6, 1998, the disclosure of which is incorporated herein by reference and is now abandoned.

BACKGROUND OF THE INVENTION

1. Field of the Invention

The present invention relates to a method for decomposing nitrogen fluoride or sulfur fluoride and a decomposing reagent used therefor.

In the present specification, the nitrogen fluoride designates a compound which comprises fluorine and nitrogen as essential constituent elements and which easily volatilizes. A typical example of nitrogen fluoride is nitrogen trifluoride ($NF_3$). Sulfur fluoride designates a compound which comprises fluorine and sulfur as essential constituent elements and which easily volatilizes. A typical example of sulfur fluoride is sulfur hexafluoride ($SF_6$). "A compound which easily volatilizes" herein denotes a compound which is a gas at room temperature and normal pressure, or a compound which is a liquid at room temperature but which forms a gas mixture containing at least 0.01% by volume of the compound as a vapor it an inert gas is co-present.

2. Description of the Related Art

Since nitrogen fluoride and sulfur fluoride defined above are thermally stable, they are used, for example, as gases for etching or cleaning in processes for manufacturing semiconductor devices. However, nitrogen fluoride and sulfur fluoride are substances which are suspected to have an influence on global warming because they have a large global warming potential (GWP) value and remain in the atmosphere without decomposition when released in the air, and it is said that they are preferably decomposed after use. Accordingly, decomposition of used nitrogen fluoride and sulfur fluoride into nontoxic substances is required.

A combustion decomposition method, a reagent decomposition method, a catalytic decomposition method, and the like have heretofore been proposed as technologies for decomposing nitrogen fluoride.

Decomposition of nitrogen fluoride by the combustion method unavoidably forms by-product $NO_x$. The combustion method, therefore, requires removal of the by-product and an additional treatment of the fluorine component. Accordingly, the combustion method is not efficient from the standpoint of recovering the fluorine component. The proposed reagent decomposition methods and catalytic decomposition methods require special treating conditions to increase the decomposition efficiency, and special treatment is required for recovery of the fluorine component formed by the decomposition. Accordingly, the decomposition operation in situ where nitrogen fluoride is used (generation source of a nitrogen fluoride gas) cannot be simply conducted.

Furthermore, no method for efficiently and completely decomposing sulfur fluoride such as sulfur hexafluoride ($SF_6$) into nontoxic substances has ever been known.

An object of the present invention is, therefore, to provide a method for decomposing nitrogen fluoride or sulfur fluoride, which allows decomposition of nitrogen fluoride or sulfur fluoride at a high efficiency by a simple operation and efficient recovery of decomposed fluorine, and to provide a decomposing reagent therefor.

SUMMARY OF THE INVENTION

The above object is solved in accordance with the present invention by providing a method for decomposing nitrogen fluoride or sulfur fluoride comprising contacting at least one of nitrogen fluoride and sulfur fluoride gases with a solid reagent containing elemental carbon and one or more of the alkaline earth metal elements.

More specifically, nitrogen fluoride can be decomposed by contacting a nitrogen fluoride gas with the reagent as mentioned above at a temperature of 200° C. or more. In the decomposition, formation of by-product carbon fluoride can be inhibited by contacting the nitrogen fluoride gas with the reagent at a temperature of 200 to 450° C. or at a temperature of not less than 700° C. Moreover, formation of by-product nitrogen oxide can be inhibited by contacting the nitrogen fluoride gas with the reagent at a temperature of 350° C. or more.

Furthermore, when the reagent mentioned above further contains an alkali metal element, a nitrogen fluoride gas can be similarly decomposed at a contact temperature of 200° C. or more. Moreover, formation of by-product carbon fluoride can be inhibited by contacting the nitrogen fluoride gas with the reagent at a temperature of 200 to 450° C. or at a temperature of not less than 700° C. Furthermore, formation of by-product nitrogen oxide can be inhibited at the contact temperature of 250° C. or more, lower than the lower limit of the contact temperature in the above case where the reagent does not contain an alkali metal element.

Similarly, sulfur fluoride can be decomposed by contacting a sulfur fluoride gas with a solid reagent containing elemental carbon and an alkaline earth metal element at a contact temperature of 300° C. or more. In the decomposition, formation of by-product sulfur oxide such as $SO_2$ can be inhibited by contacting the sulfur fluoride gas with the reagent at a temperature of 450° C. or more.

Furthermore, a sulfur fluoride gas can be similarly decomposed at a contact temperature of 300° C. or more when the reagent further contains an alkali metal element. In addition, in this case, formation of by-product sulfur oxide can be inhibited at a temperature lower than in the case where the reagent does not contain an alkali metal element. More concretely, formation of by-product $SO_2$ can be inhibited from a temperature of 350° C. or more.

DESCRIPTION OF PREFERRED EMBODIMENTS OF THE INVENTION

Figure 1:
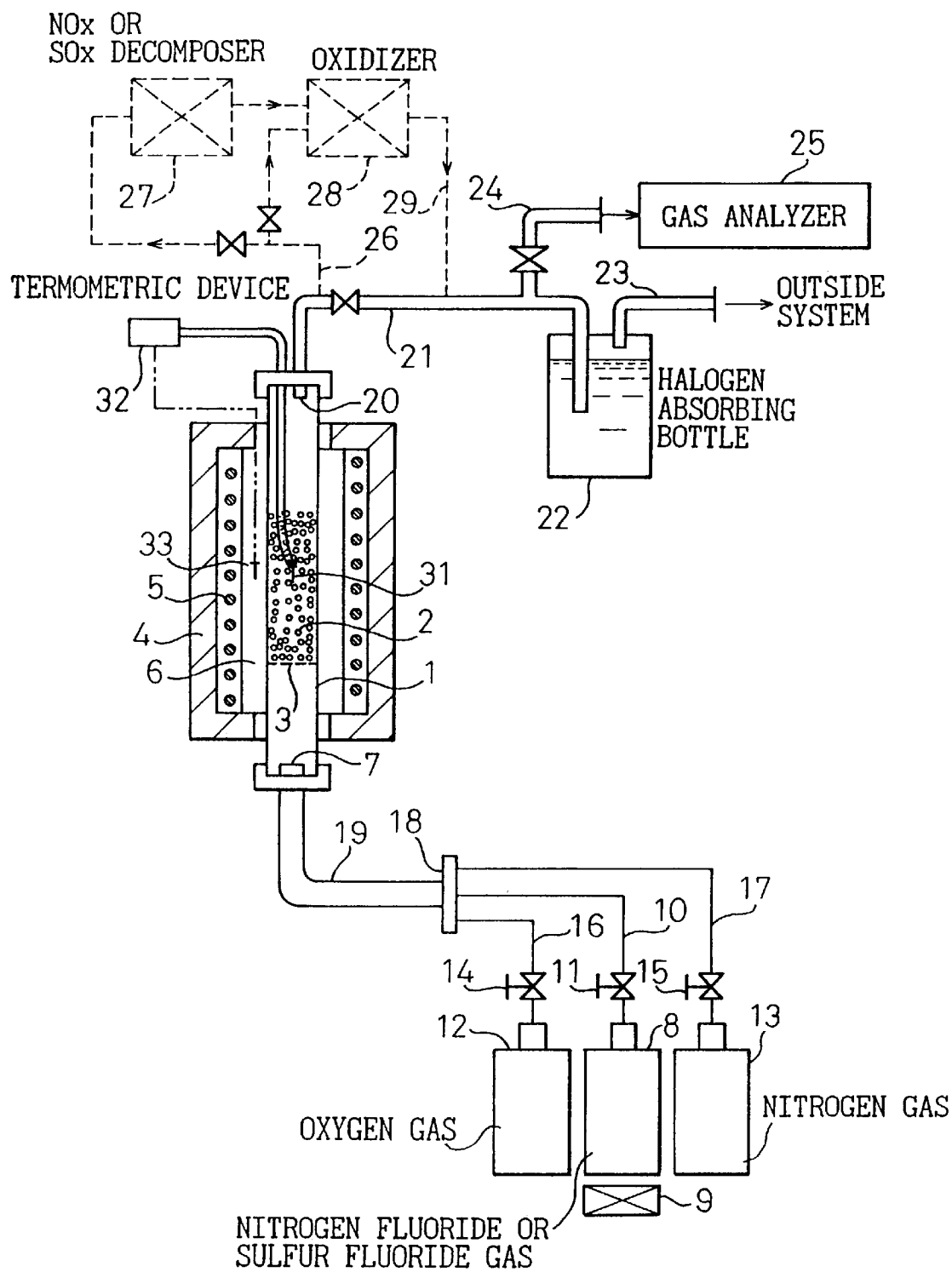
FIG. 1 is a schematic diagram of an apparatus arrangement showing an embodiment of a system for carrying out the method of the present invention.

The method for decomposing nitrogen fluoride or sulfur fluoride according to the present invention is characterized by using a solid reagent for decomposition comprising elemental carbon, one or more of the alkaline earth metal elements, and optionally one or more of the alkali metal elements. This reagent for decomposition is a solid material comprising elemental carbon, an alkaline earth metal element and optionally an alkali metal element, in which the proportional content in terms of the atomic ratio of the alkaline earth metal element to elemental carbon to the alkali metal element preferably be 1.0:0.25–4.0:0–0.3. The proportion is represented in terms of the atomic ratio because the proportional content of the metal element components in the reagent are important when the alkaline earth metal element or the alkali metal element is contained therein in the form of various compounds such as oxides and carbonates.

When such a reagent is contacted with a nitrogen fluoride gas at an appropriate temperature, the nitrogen fluoride is decomposed. Fluorine formed by decomposition is fixed to the reagent, and nitrogen formed by the decomposition can be inhibited from forming $NO_x$ (nitrogen oxide such as $N_2O$, NO and $NO_2$). That is, in accordance with the present invention, nitrogen fluoride can be efficiently decomposed without generating toxic by-product gases such as fluorine gas, carbon fluoride gas and $NO_x$. Similarly, when a sulfur fluoride gas is contacted with such a reagent as mentioned above at an appropriate temperature, the sulfur fluoride is decomposed. Fluorine formed by decomposition is fixed to the reagent, and generation of sulfur oxide by the decomposition can be inhibited. That is, in accordance with the present invention, sulfur fluoride can be efficiently decomposed without generating toxic by-products such as fluorine gas, carbon fluoride gas and $SO_x$. In order not to generate such by-products in the decomposed gases, the reaction conditions such as the reaction temperature, the concentration of sulfur fluoride and presence or absence of other components such as oxygen in the starting gases to be decomposed, the form and the component proportion of the reagent, and the gas feed rate should be appropriately adjusted. The most important condition is the reaction temperature, as will be shown in the following Examples.

That is, it has been found that when nitrogen fluoride is contacted with the reagent at a temperature of 200 to 450° C. or of 700° C. or more (actually the temperature of the reagent), the fluorine component in nitrogen fluoride can be completely fixed to the reagent while generation of fluorine gas is inhibited, and formation of carbon fluoride caused by the reaction of the fluorine component with carbon in the reagent is inhibited. When the contact temperature is higher than 450° C. and less than 700° C., carbon fluoride such an $CF_4$ may be formed in a slight amount. The formed carbon fluoride gas is not decomposed by the reagent in this temperature range. However, it is considered that in the temperature range of 700° C. or more, carbon fluoride, even if it is temporarily formed, is decomposed by the reagent, and fluorine formed by the decomposition is fixed to the reagent. At a temperature of 450° C. or less, it is considered that carbon fluoride is not formed at all.

The discharged gas sometimes contains CO. In such a case, it is satisfactory that the discharged gas be released outside the system after oxidation treatment thereof. Moreover, in a low reaction temperature range, $NO_x$ may be formed. For example, nitrogen oxide is sometimes formed in a slight amount at a temperature lower than 350° C. by the reagent comprising elemental carbon and an alkaline earth metal element, at a temperature less than 250° C. by the reagent comprising elemental carbon, an alkaline earth metal element and an alkali metal element. Accordingly, formation of nitrogen oxide can be inhibited by employing the reaction temperature of 350° C. or more for the former reagent, and 250° C. or more for the latter reagent.

Furthermore, it has been found that fluorine in sulfur fluoride is completely fixed to the reagent and the fluorine component is not involved in the discharged gas if the reaction temperature is held at 300° C. or more. It has also been found that a reaction of carbon in the reagent with the fluorine to form carbon fluoride is also inhibited. Furthermore, it has also been found that when the reaction temperature is held at 450° C. or more, a reaction of sulfur with oxygen in the gas to be treated or in the reagent to form sulfur oxide is also inhibited. However, as will be shown in the following Examples, sulfur oxide is sometimes formed to some extent in a low reaction temperature range, depending on the reaction conditions.

The discharged gas contains CO sometimes. When the discharged gas contains CO, the discharged gas may be released outside the system after oxidation treatment. In the cases where the reaction temperature is low as described above, $SO_2$ may be formed sometimes, for example, at a temperature of less than 450° C. when the reagent does not contain an alkali metal element, and at a temperature of less than 350° C. when the reagent contains an alkali metal element, but in such a case, the discharged gas may be released outside the system after desulfurization treatment. Moreover, it was considered that elemental carbon in the reagent may react with fluorine to form carbon fluoride, but it has been found that carbon fluoride is not substantially formed under the conditions shown in the following Examples.

The elemental carbon in the reagent is considered to contribute to the decomposition of nitrogen fluoride and sulfur fluoride in the presence of an alkaline earth metal element. Although the content of the elemental carbon in the reagent may be varied as the decomposition reaction proceeds, it is preferred that the reagent contains the same in an atomic ratio of elemental carbon to the alkaline earth metal element of at least 0.25:1.0 at least in the initial stage of the decomposition reaction. If the ratio is less than 0.25, decomposition of nitrogen fluoride or sulfur fluoride sometimes does not proceed sufficiently. However, if the reagent contains the elemental carbon in such an amount that the ratio exceeds 4.0, the alkaline earth metal element content is reduced in accordance with the ratio, and the decomposition reaction may not be effected sufficiently. Accordingly, the atomic ratio of the elemental carbon to alkaline earth metal element in the reagent may be 0.25–4.0:1.0, preferably 0.5–3.0:1.0, more preferably 1.0–2.0:1.0. Moreover, the amount of the elemental carbon in the reagent is desirably maintained from the initial stage to the midpoint of the decomposition reaction. The elemental carbon herein denotes solid carbon present in uncompounded form, and carbon atoms constituting a specific compound are not included in the elemental carbon. An example of the carbon in a specific compound is carbon in a carbonate. The carbon in the reagent denoted in the present specification means elemental carbon, unless otherwise noted.

The elemental carbon can be incorporated in the reagent in the form of charcoal, activated carbon, carbon black or coke powder. The elemental carbon may also be in the form of carbon fibers, graphite or materials containing inorganic carbonaceous material as the principal component. When the reagent is a pellet, such a carbonaceous material in powder in combination with other raw materials (an alkaline earth metal compound and optionally an alkali metal compound) may be pelletized. Moreover, in order to obtain a reagent of a fired product, a powder material of such a carbonaceous material mixed with other raw materials (an alkaline earth metal compound, or an alkaline earth metal compound and an alkali metal compound) may be fired.

The particle size of the elemental carbon is not particularly limited but is preferably in a range of 1 to 5 mm, particularly in a range of 2 to 3 mm. If the particle size is too large, the efficiency of contact with a gas is low, which is not preferred.

The alkaline earth metal element in the reagent acts to decompose nitrogen fluoride and sulfur fluoride, in the presence of the elemental carbon. For example, when the alkaline earth metal element, nitrogen fluoride and sulfur fluoride to be used for decomposition are Ca, $NF_3$ and $SF_6$, respectively, examples of the reactions are as follows:

$6CaO+4NF_3+3C \rightarrow 6CaF_2+2N_2+3CO_2$ $6CaO+4NF_3 \rightarrow 6CaF_2+2N_2+3O_2$ $4CaO+SF_6 \rightarrow 3CaF_2+CaSO_4$ As a result, Ca plays the role of fixing fluorine in nitrogen fluoride or sulfur fluoride in the form of $CaF_2$.

The alkaline earth metal element is thus a fundamental component of the reagent in the present invention. Therefore, in the present specification, the relative proportions of the elemental carbon and the alkali metal element are defined based on the content of the alkaline earth metal element. Accordingly, the actual amount of the alkaline earth metal element in the reagent is determined in relation to the content of the elemental carbon and further that of the alkali metal element. If the relative amount of the alkaline earth element is too small, the relative ratio of the amount of the alkaline earth metal element, contributing to the decomposition reaction, to the amount of carbon lowers as the reaction proceeds, and it becomes impossible to obtain a high decomposition ratio. Conversely, if the relative amount of the alkaline earth metal element is excessive, the relative ratio of the amount thereof to the amount of carbon becomes too high, and it also becomes impossible to obtain a high decomposition efficiency.

The alkaline earth metal element can be Be, Mg, Ca, Sr, Ba and Ra and may be contained in the reagent in the form of an oxide, hydroxide or salt such as carbonate of these elements. Of these alkaline earth metal elements, Ca and Mg are preferred and can be easily treated since the starting materials and the decomposition reaction products thereof are nontoxic. A raw material in an oxygen-containing form, such as an oxide, a hydroxide or a carbonate of Ca or Mg is stable, and can be treated easily. Concrete examples of such starting materials include quick lime, slaked lime, marble, magnesium carbonate and dolomite. Of these compounds, compounds in the form of oxides are particularly preferred to be contained in the reagent.

When Ca or Mg are contained in the reagent in the form of an oxygen-containing compound as explained above, nitrogen fluoride or sulfur fluoride can be decomposed more advantageously, because it is supposed that the reagent becomes more active in the decomposition reaction of nitrogen fluoride or sulfur fluoride when the oxygen in the oxygen-containing compound reacts with carbon fluoride or substitutes for fluorine in nitrogen fluoride or sulfur fluoride, or the oxygen in a gaseous phase reacts with carbon in the reagent.

When an alkali metal element is present in the reactants in addition to the elemental carbon and the alkaline earth metal element, nitrogen fluoride and sulfur fluoride can be decomposed at a high decomposition ratio even at a lower decomposition temperature compared with the decomposition using the similar reagent containing no alkali metal element. Moreover, the reaction temperature range where nitrogen oxide and sulfur oxide are not formed can be shifted to the lower temperature side, and the temperature range where carbon fluorides are not formed can also be shifted to the lower temperature side. Although the alkali metal element includes Li, Na, K, Rb, Cs, etc., K has been found to show such effects to a significant extent. The content ratio in terms of atomic ratio of the alkali metal element to the alkaline earth metal element in the reagent may be 0–0.3:1.0. When the reagent contains the alkali metal element in such an amount that the ratio exceeds 0.3, the effects of the alkali metal element are saturated, and the contents of the elemental carbon and the alkaline earth metal element are relatively lower, which is not preferred.

The alkali metal element, for example, K, may be contained in the reagent by incorporating the same in the form of a compound such as a hydroxide, a carbonate, a phosphate, an aluminate, a nitrate or a sulfate. These compounds may be incorporated singly or in combination, and as powder if the compound is in powder form, or after grinding to a particle size of up to 100 μm if it is in bulk form. These compounds may also be added in the form of an aqueous solution.

It is desirable that the total amount of the elemental carbon, the alkaline earth metal element and optionally the alkali metal element be 50% by weight or more of the entire reagent. Although nitrogen fluoride or sulfur fluoride can be decomposed even if the total amount of these substances is less than 50% by weight, a total amount of 50% by weight or more is preferred to decompose the fluorides efficiently. The remaining components may be the components of compounds containing the alkaline earth elements and or other compounds and it is desired that the majority of the remaining components be oxygen, but the remaining components may include impurities such as moisture and $CO_2$ accompanying the raw materials.

As described above, the reagent for nitrogen fluoride or sulfur fluoride of the present invention is a solid material which contains elemental carbon and an alkaline earth metal element as essential components, and which may also contain an alkali metal element as an optional component. The solid reagent is preferably pelletized because the pellets can have increased contact with nitrogen fluoride or sulfur fluoride gases to be decomposed. In order to pelletize the solid reagent, the aforementioned starting materials in powder form re mixed, pelletized with a suitable amount of water and if necessary an appropriate binder, and dried to evaporate the water and obtain the the pellets.

Fired pellets are the most preferred pelletized material. That is, the most preferred pelletized material is a fired material obtained by mixing a carbonaceous material powder, an alkaline earth metal compound powder and optionally an alkali metal compound powder, and firing the powder mixture, or by mixing a carbonaceous material powder and an alkaline earth metal compound powder, firing the powder mixture, coating or impregnating the fired material with a solution of an alkali metal compound, and drying the coated or impregnated material to remove the volatile component (solvent). The materials for the starting materials for obtaining the fired material can comprise the carbonaceous material, the alkaline earth metal compound and the alkali metal compound which are described above.

Typical examples of the fired material include a material obtained by firing a kneaded material containing a carbonaceous material powder and slaked lime (and optionally a potassium compound) under conditions sufficient to induce a reverse slaking reaction of slaked lime while carbon remains, or a material obtained by firing a kneaded material containing a carbonaceous material powder and calcium carbonate (and optionally a potassium compound) under conditions sufficient to induce a decomposition reaction of calcium carbonate while carbon remains. In the incorporation of the potassium compound into the kneaded material, the compound can be in a powder state or in an aqueous solution.

The kneaded material preferably comprises a pelletized material having a particle size of up to 100 $\mu$m, in which the raw materials are homogeneously mixed. The production of the pelletized material comprises weighing the mixed raw materials, and adding a suitable amount of water for the kneading. The addition of water can be replaced with an aqueous solution containing an alkali metal element. A kneader which can conduct mixing and pelletization simultaneously is suitable, but mixing and pelletization may be separately conducted. For example, a Henschel mixer or vertical mixer can conduct mixing and pelletization simultaneously. However, only mixing of the raw materials may be conducted by a Henschel mixer or V-type mixer, followed by conducting pelletization with a dish type granulator or drum pelletizer.

In the mixing and pelletization, a suitable amount of a binder may be added in addition to water or an aqueous solution. An organic binder such as polyvinyl alcohol (PVA) can be used as the binder. Moreover, an inorganic binder such as aluminum oxide-based or silicon oxide-based ones can also be used. However, the amount thereof must be restricted such that the performance of the reagent for decomposition thus obtained is not influenced.

The kneaded and pelletized particles are preferably fired under such conditions that the moisture and volatile components are removed and the fired material has a suitable strength. It is preferred that heat treatment for firing be conducted in an inert atmosphere for the purpose of preventing carbon in the mixed raw materials from being oxidized and consumed. If the firing is conducted in an inert atmosphere, a heat treatment at a high temperature is possible, and a fired material can have a high strength. Although a continuous system such as a rotary kiln can be used an apparatus for firing, a fixed furnace can also be used.

The reagent for decomposition according to the present invention preferably has a low water content and generates no water during the decomposition reaction. A reagent which releases water in an amount of not more than 15% by weight when heated at 800° C. in an inert atmosphere is preferred.

Next, a method and a system for decomposing nitrogen fluoride or sulfur fluoride using the reagent as described above will be described.

The decomposition treatment of nitrogen fluoride or sulfur fluoride according to the present invention can be carried out by feeding a nitrogen fluoride-containing gas or a sulfur fluoride-containing gas to be treated to a reaction vessel charged with the reagent. In the decomposition treatment, the temperature of the reactants, namely the reaction temperature, is held at 200° C. or more for nitrogen fluoride, and at 300° C. or more for sulfur fluoride and the reaction atmosphere may be a nonoxidizing atmosphere or weakly oxidizing atmosphere. Since the reagent containing an alkali metal element has a higher activity compared with those containing no alkali metal element, the decomposition may sometimes be adequately achieved even in a nonoxidizing atmosphere but can also be carried out in a weakly oxidizing atmosphere, for example, in an atmosphere of the gas to be treated containing from 0.01 to 25% by volume of oxygen. There is no specific limitation on the concentration of nitrogen fluoride or sulfur fluoride in the gas to be treated, and even a gas containing 100% of nitrogen fluoride or sulfur fluoride can be decomposed. However, the gas to be treated may also be diluted with an inert gas, and further with an oxygen-containing gas. Preferred decomposition temperatures are determined in accordance with the concentration of nitrogen fluoride or sulfur fluoride in a gas to be treated for decomposition, the concentration of an oxygen-containing gas in the gas to be treated, the SV (superficial velocity), the LV (linear velocity), the state of mixing of the gas with other gases, the component ratio and the form of the reagent of the present invention, and moreover the degree of inhibition of formation of by-products such as nitrogen oxide, sulfur oxide and carbon fluorides.

The decomposition treatment can be carried out with a decomposition system for nitrogen fluoride or sulfur fluorides, comprising a reaction vessel charged with the reagent, an inlet for a gas to be treated communicating to the reaction vessel, a gas discharge outlet provided so that the gas after the reaction is discharged from the reaction vessel, a furnace for accommodating the reaction vessel, a heating source for elevating the temperature of the atmosphere within the furnace to 200° C. or more, a pipe connecting the inlet for a gas to be treated and a nitrogen fluoride-containing gas source or sulfur fluoride-containing gas source, and optionally an exhaust gas oxidizer communicating through a pipe to the gas discharge outlet.

FIG. 1 shows one embodiment of a system for carrying out the method of the present invention. In the figure, the reference numeral 1 designates a reaction vessel (tube) made of a metal which is charged with a reagent 2 composed of the reagent as described above. In the figure, a tubular reaction vessel 1 is vertically arranged and the reagent 2 is placed on a through-flow bed 3 fixed within the vessel. The metal pipe of the reaction vessel 1 can be a pipe of a stainless steel or a nickel-based alloy.

The reaction vessel 1 is installed within a heating furnace 4. The heating furnace 4 shown in the figure has an electrical heater 5 having a heating element which generates heat when a current is applied to it, as a heating source. The in-furnace atmosphere 6 is heated with the electrical heater 5 to a predetermined temperature, and the heat within the furnace is transferred to the reagent 2 through the wall of the metal-made reaction vessel. The heating source is not limited to an electrical heater so long as the temperature of the in-furnace atmosphere 6 can be raised to the predetermined temperature. For example, a high temperature gas such as a combustion exhaust gas can also be used as a heating source.

An inlet 7 for a gas to be treated is provided for the reaction vessel 1 installed within the heating furnace 4. The inlet 7 for a gas to be treated is connected to a container 8 containing nitrogen fluoride or sulfur fluoride through a pipe. The container 8 can be indirectly heated by heating means 9 if necessary, and the gas pressure of nitrogen fluoride or sulfur fluoride within the container 8 is increased by the heating. A gas discharge pipe 10 from the container 8 is provided with a flow rate control valve 11. In the embodiment in FIG. 1, an oxygen gas bomb 12 and a nitrogen gas bomb 13 are separately placed in addition to the container 8. An oxygen gas and a nitrogen gas are once introduced into a gas header 18 from the respective bombs through gas discharge pipes 16, 17 provided with flow rate control valves 14, 15, respectively, and nitrogen fluoride or sulfur fluoride is introduced into the header 18, so that the nitrogen gas is mixed as a carrier with gaseous nitrogen fluoride or gaseous sulfur fluoride and the oxygen gas can be optionally added. Consequently, the gas to be treated, mixed in the header 18, is fed to the inlet 7 for a gas to be treated of the reaction vessel 1 through a gas feed pipe 19.

In addition, the following procedures may also be conducted in place of the above embodiment. A gas mixture prepared in advance by mixing nitrogen fluoride or sulfur fluoride, nitrogen and oxygen may be provided in one container, and the gas mixture directly fed to the inlet 7 for a gas to be treated. Alternatively, a nitrogen gas is fed to the container 8 for nitrogen fluoride or sulfur fluoride so that nitrogen fluoride or sulfur fluoride is forcibly expelled from the container, and an oxygen gas may be added to the discharge pipe path. In any case, an oxygen gas feed pipe is preferably connected to the container 8 itself or a pipe from the container 8 to the inlet 7 for a gas to be treated.

On the other hand, an exhaust gas pipe 21 is connected to a gas discharge outlet 20 of the reaction vessel 1, and the exhaust gas pipe 21 is connected to a halogen-absorbing bottle 22 to which a gas discharge pipe 23 is attached. Moreover, a sampling pipe 24 is attached to the exhaust gas pipe 21, and an exhaust gas sampled with the sampling pipe 24 is fed to a gas analyzer 25.

A branch pipe 26 is provided to the exhaust gas pipe 21, and pipes are arranged from the branch pipe 26 to a $NO_x$ decomposer or desulfurizer 27 and to an oxidizer 28. A returning pipe 29 is optionally provided so that the gas having passed through said devices is returned to the exhaust gas pipe 21. That is, if the exhaust gas is accompanied by $NO_x$ or $SO_x$, $NO_x$ or $SO_x$ is decomposed in the $NO_x$ decomposer or desulfurizer 27 charged with a conventional $NO_x$ or $SO_x$ decomposition catalyst. If the exhaust gas is accompanied by CO, CO is oxidized to form $CO_2$ by the oxidizer 28 charged with a noble metal catalyst such as platinum or palladium, or a hopcalite catalyst. The gas thus treated is returned to the exhaust gas pipe 21.

In the system in FIG. 1, the temperature of the atmosphere within the heating furnace 4 heats the reagent 2 in the reaction vessel 1 through the vessel wall, and the temperature changes depending on the heat of reaction and the balance between the heat capacity of introduced gas and that of the exhaust gas. As shown in FIG. 1, the temperature of the reaction zone is detected by a temperature sensor (thermocouple) 31 which is inserted approximately in the center of the reagent 2 and is connected to a thermometric device 32. The quantity of heat supplied from the heating source 5 is controlled so that the detected temperature is held at a given temperature. Moreover, the temperature of the in-furnace atmosphere 6 in the heating furnace 4 is also detected by a temperature sensor 33, and the temperature of the heating furnace itself is suitably controlled based on the detected value.

As explained above, nitrogen fluoride and sulfur fluoride in the gas to be treated are almost completely decomposed (at a decomposition ratio close to 100%), and the fluorine thus decomposed reacts with the alkaline earth metal element in the reagent to form an alkaline earth metal fluoride. As a result, nitrogen fluoride or sulfur fluoride and fluorine are substantially absent from the exhaust gas. Moreover, when the exhaust gas accompanies $NO_x$ or $SO_x$ and CO, such gases can be treated to become nontoxic by the $NO_x$ decomposer or desulfurizer 27 and the oxidizer 28.

Furthermore, if the exhaust gas includes carbon fluorides, the carbon fluorides can be decomposed and fluorine in carbon fluorides can be fixed to the reagent by recirculating the carbon fluoride-containing gas in another system which is substantially the same as that in FIG. 1 and is placed separately, or in the same system as in FIG. 1.

Figure 2:
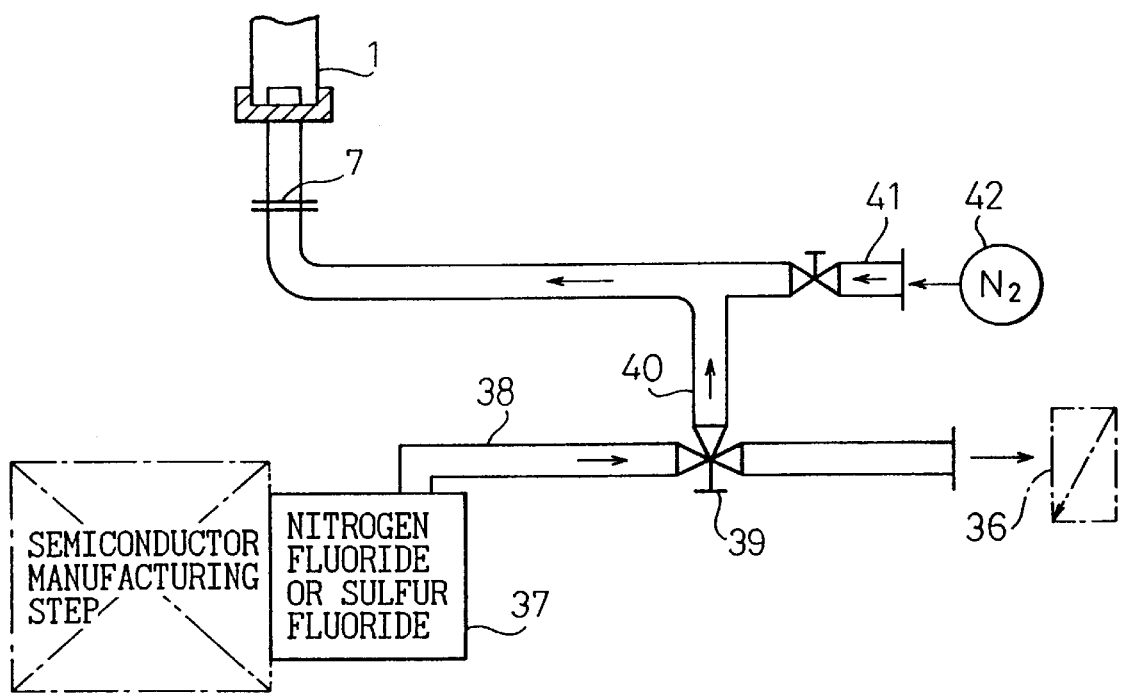
FIG. 2 is a schematic diagram of an apparatus arrangement showing another embodiment of a portion for introducing a gas to be treated for carrying out the method of the present invention.

FIG. 2 shows an embodiment in which spent nitrogen fluoride or sulfur fluoride used in the process of manufacturing semiconductors is decomposed by the present invention. Spent nitrogen fluoride or sulfur fluoride 37 discharged from the process of manufacturing semiconductors is generally fed to a routine processing step 36 via a pipe 38. In the application of the present invention, the feed pipe 38 of nitrogen fluoride or sulfur fluoride is connected to the inlet 7 for a gas to be treated of the reaction vessel 1. In the embodiment shown in the figure, a branch pipe 40 is attached to the feed pipe 38 through a three way valve 39, and the branch pipe 40 is connected to the inlet 7 for a gas to be treated. A nitrogen gas feed pipe 41 is connected to the branch pipe 40, and a nitrogen gas can be fed to the branch pipe 40 with a variable flow rate under a pressure from a nitrogen gas source 42. Consequently, even if the raw material gas is difficult to flow into the side of the branch pipe 40 through the three way valve, the raw material gas can be transported to the inlet 7 for a gas to be treated at a substantially constant flow rate by sending the necessary amount of nitrogen gas from the nitrogen gas source 42.

Figure 3:
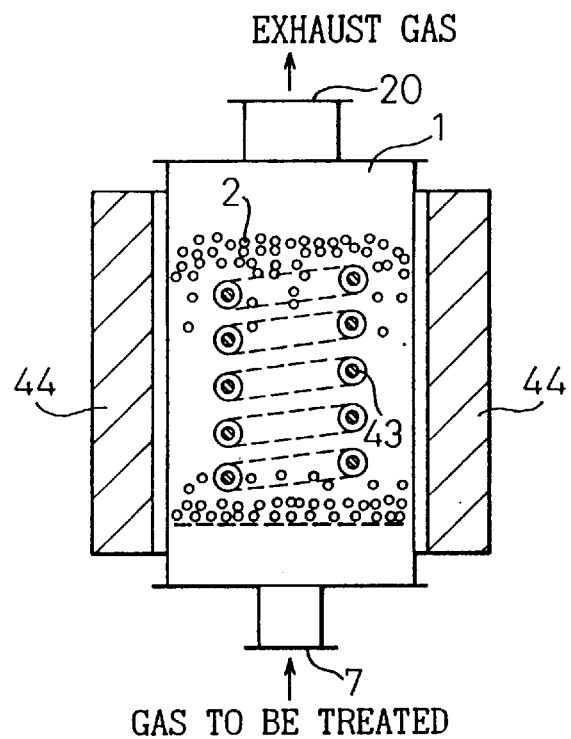
FIG. 3 is a schematic cross-sectional view of a reaction vessel portion showing an embodiment of heating the reagent from the interior of the reaction vessel according to the method of the present invention.
Figure 4:
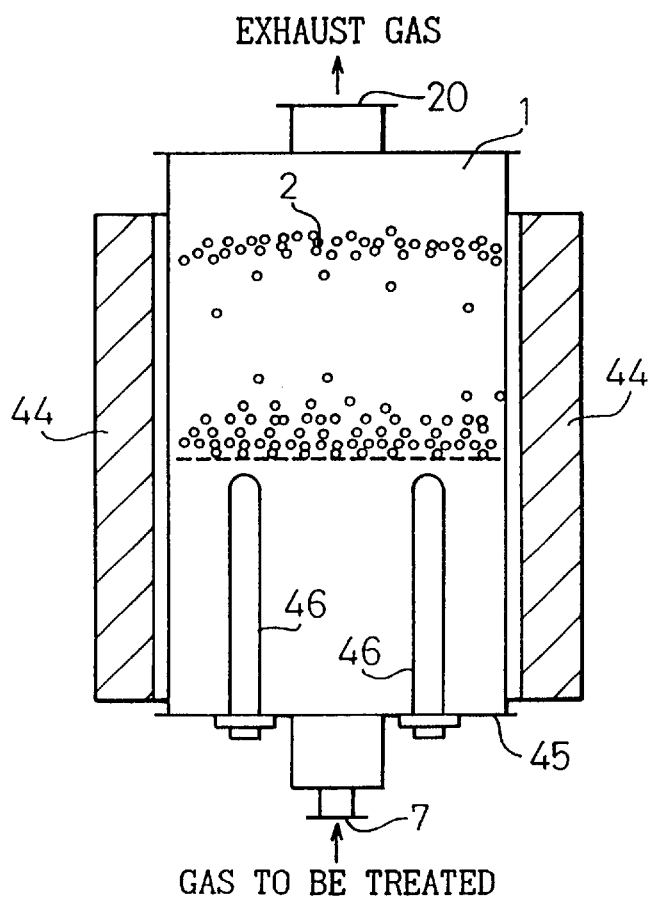
FIG. 4 is a schematic cross-sectional view of a reaction vessel portion showing another embodiment of heating the reagent from the interior of the reaction vessel according to the method of the present invention.

FIG. 3 and FIG. 4 show embodiments of the present invention, in each of which, a heating source is provided in the interior of the reaction vessel 1, and heat is transferred to the reagent 2 from the interior of the vessel. In both figures, the reference numerals 44 denote a heat-resistant furnace material surrounding the reaction vessel 1, 7 denotes the inlet for a gas to be treated of the reaction vessel, and 20 denotes the gas discharge outlet from the reaction vessel.

In FIG. 3, a heating element 43 which generates heat by application of current is arranged in the interior of a packed bed of the reagent 2, and the heating element 43 is covered with a corrosion-resistant, heat-resistant cover. According to the present embodiment, since heat is transferred from the interior of the packed bed of the reagent 2, the rate of heating the reagent to a desired temperature can increase, and the heat loss can be reduced.

In FIG. 4, the interior of the reaction vessel 1 is separated into a packed bed of the reactants 2 and a heating layer. A gas to be treated is introduced into the reaction vessel and passed through the heating layer and allowed to flow into the packed bed of the reactants. Heating elements 46 which generate heat in the heating layer by application of current are attached to a vessel cover 45. Heat is imparted to the gas to be treated when the gas passes through the heating layer, and heat is also transferred to the reagent 2 at the same time. Since electrical heaters are placed within the reaction vessel in the present embodiment, the system has the following advantages: the utilization efficiency of heat becomes high and the heating elements 46 are less deteriorated because they do not contact the reagent or the gas subsequent to the reaction.

Figure 5:
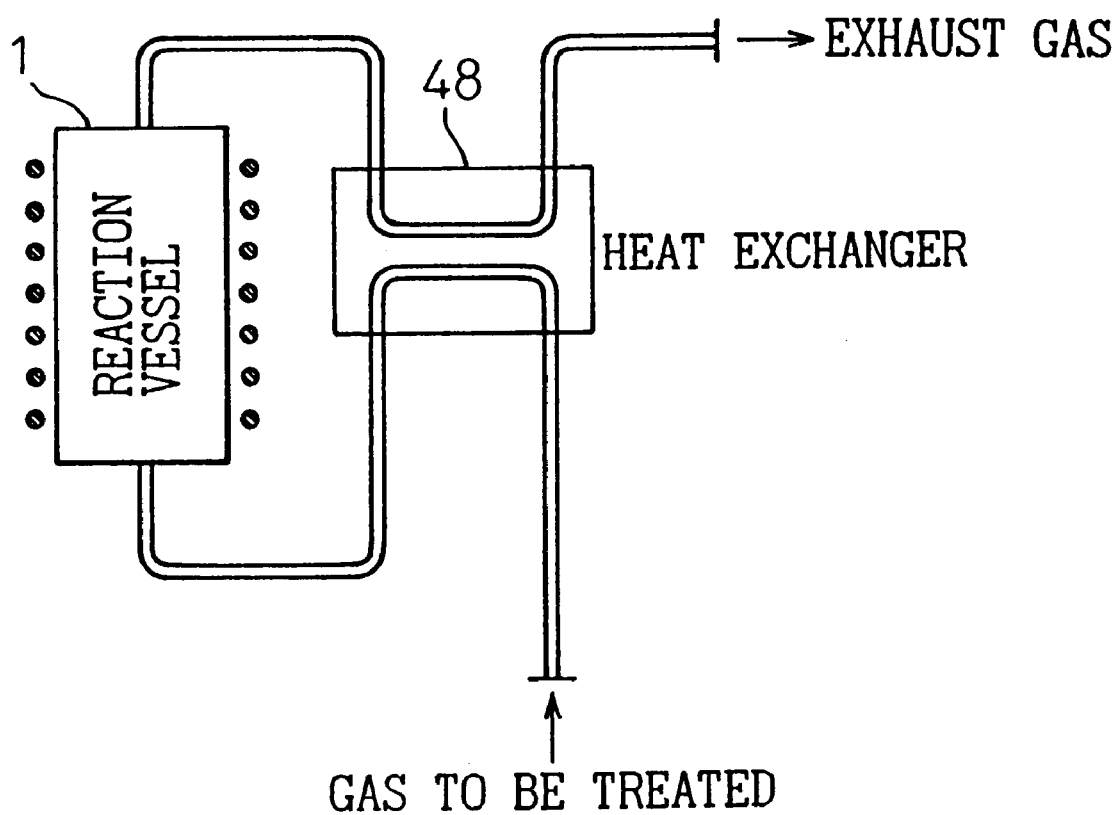
FIG. 5 is a diagram showing one embodiment of conducting a heat exchange between a gas to be treated before entering a reaction vessel and an exhaust gas discharged from the reaction vessel, in carrying out the present invention.

FIG. 5 shows an embodiment of the present invention wherein a heat exchanger 48 for exchanging heat between a gas to be treated prior to introduction to the reaction vessel 1 having a heating source and an exhaust gas discharged from the reaction vessel 1 is arranged. By arranging the heat exchanger 48, the sensible heat of the exhaust gas is imparted to the gas to be treated so that the heat can be recovered. The heat consumption of the heating source can, therefore, be lowered.

In the system of the present invention as described above, the decomposition reaction finishes when the charged reagent is entirely consumed. The reaction end point occurs when nitrogen fluoride or sulfur fluoride are first detected in the exhaust gas or when a minor amount of $NO_x$ or $SO_x$ is detected. When the reaction finishes, the operation of the system may be stopped, and the reagent newly charged, followed by starting the reaction, that is, the system can be operated in a batch process in which nitrogen fluorides or sulfur fluoride can be successively decomposed by the same system. In order to make the batch process continuous, a double reaction vessel change-over system wherein two similar systems are installed in parallel can be employed; one system is operated while the reagent of the other system is renewed with a fresh reagent; when the operating system is stopped, the gas flow paths are changed from the stopped system to the other system. Moreover, the same system can be continuously used over a long period of time if in the system, a fresh reagent can be continuously or intermittently supplied to the reaction vessel and the spent reagent can be continuously or intermittently discharged therefrom.

In accordance with the present invention, nitrogen fluoride or sulfur fluoride can be efficiently decomposed at a relatively low temperature by a simple process and the fluorine obtained by the decomposition can be fixed to the reagent as a nontoxic substance. That is, the method for decomposing nitrogen fluoride and sulfur fluoride of the present invention, can be carried out with a simple decomposition system, the decomposition operation is simple, the decomposition efficiency is high, and the decomposition products are stabilized fluorides such as $CaF_2$ and can be easily subjected to after-treatment. Furthermore, low cost of the reagent provides novel effects. In particular, the method of the present invention can greatly contribute to the decomposition of spent nitrogen fluoride generated in the production process of semiconductors.

The above descriptions have been principally directed to separate decomposition of nitrogen fluoride and sulfur fluoride. However, it is clear that the present invention can also be applied to the decomposition of a mixture of nitrogen fluoride or sulfur fluoride with other fluorides, particularly to a mixture of nitrogen fluoride and sulfur fluoride.

EXAMPLES

Example 1

The method of the present invention was carried out using a system in accordance with the same principle as that in FIG. 1 (however the $NO_x$ decomposer and the oxidizer were excluded). That is, a tubular furnace equipped with a heating element (kanthal alloy) which generated heat on application of an electric current (electric capacity of 0.4 kW) was penetrated by a reaction tube having an inside diameter of 16 mm and a length of 300 mm and composed of Inconel 600 along the central axis of the furnace. A reagent for decomposing nitrogen fluoride in an amount of 35 ml was charged in the central portion of the reaction tube.

The reagent was in the form of pellets prepared from charcoal, slaked lime and potassium hydroxide as raw materials, and was prepared in the following manner.

Charcoal having a particle size of up to 250 µm, slaked lime having a particle size of up to 250 µm and potassium hydroxide (cases where potassium hydroxide was not added are also included) with varied mixing ratios were mixed in a Henschel mixer, and water was added to the mixture, followed by pelletizing the mixture. The resultant pellets were dried at 110° C. for 4 hours, and heat treated in a nitrogen atmosphere at 800° C. for 8 hours to dehydrate and fire the same. The fired material thus obtained was screened to give pellets having a particle size of up to 10 mm and an average particle size of about 3 mm.

The charcoal used as a raw material contained 78% of fixed carbon, 9% of a volatile constituent, 3% ash and 10% of a water. The slaked lime used as a raw material was a material specified by JIS R9001. Potassium hydroxide which was a first grade reagent was used. As a result of analyzing the pellets thus produced, the reagent pellets were found to contain elemental carbon (C) and calcium oxide (CaO) as principal components. Those reagents prepared by adding potassium contained potassium to some extent. Of these, the following two reagents A and B were selected as typical ones, and used in Example 1. The atomic ratios of C to Ca to K, and the total content in terms of weight of these components based on the entire amount in the reagent pellets A and B are as follows:

| | Atomic ratio of C/Ca | Atomic ratio of K/Ca | Total weight % of Ca,C,K |
|---|---|---|---|
| Reagent A | 1.56/1 | 0.04/1 | 79 wt. % |
| Reagent B | 1.56/1 | 0/1 | 79 wt. % |

Nitrogen trifluoride ($NF_3$) was used as the nitrogen fluoride to be decomposed. As shown in FIG. 1, nitrogen trifluoride to which an oxygen gas was added or not added was introduced into the above-mentioned reaction tube with a nitrogen gas being used as a carrier.

The following fixed conditions were used. However, $CF_4$ was added to the gas to be treated in some tests.

| | |
|---|---|
| Flow rate of gas to be treated: | 0.17 l/min |
| Concentration of nitrogen fluoride in a gas to be treated: | 5% by volume |
| Superficial velocity of a gas to be treated: | 291 hr$^{-1}$ |
| Linear velocity of a gas to be treated: | 0.85 m/min |
| Concentration of oxygen in a gas to be treated: | 0 or 5% by volume |

Furthermore, in all of the examples, application of a current to a heating element was started, and the temperature of the central portion of the reagent was confirmed to have reached a predetermined temperature before introducing the gas to be treated. During the reaction, the current applied to the tubular furnace was controlled so that the temperature measured by a thermocouple inserted in the central portion of the reagent (portion which had the highest temperature in the bulk of the reagent) was held at the predetermined temperature. The temperature which was held during the reaction is referred to as the reaction temperature.

As shown in FIG. 1, part of the exhaust gas discharged from the reaction tube was sampled, and introduced into a gas analyzer. The remainder of the exhaust gas was passed through a fluorine-absorbing bottle containing a solution of sodium hydroxide, and discharged outside the system. The analysis of the exhaust gas was carried out, for nitrogen fluoride, other fluorine compounds, $O_2$, $N_2$, NO, $N_2O$, $CO_2$ and CO.

Table 1 shows the results of decomposing nitrogen trifluoride under the conditions as mentioned above using the reagent A or B while the maximum temperature of the reagent was varied. The decomposition ratio of $NF_3$ shown in Table 1 is one determined 30 minutes after starting the reaction. Nitrogen fluoride remaining in the exhaust gas was measured in a sample obtained from the exhaust gas 30 minutes after starting the reaction. The decomposition ratio was represented by a percentage of nitrogen fluoride in the exhaust gas based on nitrogen fluoride in the gas to be treated.

TABLE 1

| Test No. | Comp. of gas to be treated | | Reaction temp. ° C. | Reaction time hr | Decomposition ratio of $NF_3$ % | By-products | | |
|---|---|---|---|---|---|---|---|---|
| | $NF_3$ % | $O_2$ % | | | | $N_2O$ ppm | NO ppm | $CF_4$ % |
| 1* | 5 | 5 | 250 | 0.5 | ≥99.9 | 0.38 | ≤1 | ≤0.002 |
| 2* | 5 | 5 | 300 | 0.5 | ≥99.9 | ≤0.002 | ≤1 | ≤0.002 |
| 3* | 5 | 5 | 350 | 0.5 | ≥99.9 | ≤0.002 | ≤1 | ≤0.002 |
| 4* | 5 | 5 | 400 | 0.5 | ≥99.9 | ≤0.002 | ≤1 | ≤0.002 |
| 5* | 5 | 5 | 450 | 0.5 | ≥99.9 | ≤0.002 | ≤1 | 0.2 |
| 6* | 5 | 5 | 750 | 0.5 | ≥99.9 | ≤0.002 | ≤1 | ≤0.002 |
| 7* | 5 | 0 | 300 | 0.5 | ≥99.9 | ≤0.002 | ≤1 | ≤0.002 |
| 8* | 5 | 0 | 750 | 0.5 | ≥99.9 | ≤0.002 | ≤1 | ≤0.002 |
| 9* | $NF_3$ 2 $CF_4$ 3 | 5 | 750 | 0.5 | ≥99.9 $NF_3 + CF_4$ | ≤0.002 | ≤1 | ≤0.002 |
| 11# | 5 | 5 | 200 | 0.5 | ≥99.9 | formed | ≤1 | ≤0.002 |
| 12# | 5 | 5 | 350 | 0.5 | ≥99.9 | formed | ≤1 | ≤0.002 |
| 13# | 5 | 5 | 400 | 0.5 | ≥99.9 | ≤0.002 | ≤1 | ≤0.002 |
| 14# | 5 | 5 | 450 | 0.5 | ≥99.9 | ≤0.002 | ≤1 | 0.03 |
| 15# | 5 | 5 | 750 | 0.5 | ≥99.9 | ≤0.002 | ≤1 | ≤0.002 |

Note:
*Reagent A containing K
Reagent B containing no K

The following conclusions can be drawn from the results in Table 1. Almost 100% of the $NF_3$ was decomposed at temperatures of not less than 200° C. in all of the tests. The relationship between the reaction temperature and the by-products will be explained. Generation of $CF_4$ was observed at a temperature near 450° C. regardless of whether reagent A or B was used. When the reagent B containing no K was used, $NO_x$ was formed at temperatures near 350° C. or less, and it was not formed at temperatures of 400° C. or more. When the reagent A containing K was used, $NO_x$ was formed at temperatures of up to 250° C., and it was not formed at temperatures of 300° C. or more.

Even if the gas to be treated contained no oxygen, as in Test Nos. 7 and 8, $NF_3$ was completely decomposed, and neither $CF_4$ nor $NO_x$ was generated at a reaction temperature of 300° C. or 750° C. When a gas to be treated was accompanied by carbon fluoride $CF_4$ as in Test No. 9, it is seen that $CF_4$ was completely decomposed together with $NF_3$.

Example 2

The same system as in Example 1 (a desulfurizer and an oxidizer being excluded) was used. Moreover, 35 ml of reagent for decomposing sulfur fluoride was charged in the reaction tube at the furnace central portion. The reagents A and B prepared in Example 1 were used.

Sulfur hexafluoride ($SF_6$) was used as sulfur fluoride to be decomposed. As shown in FIG. 1, sulfur hexafluoride to which an oxygen gas was added was introduced into the reaction tube with a nitrogen gas being used as a carrier.

The following fixed conditions were used. However, $CF_4$ was added to the gas to be treated in some tests.

| | |
|---|---|
| Flow rate of a gas to be treated: | 0.17 l/mm |
| Concentration of sulfur fluoride in a gas to be treated: | 5% by volume |
| Superficial velocity of a gas to be treated: | 146 or 291 hr$^{-1}$ |
| Concentration of oxygen in a gas to be treated: | 0% or 5% by volume |

Furthermore, in all of the examples, application of a current to the heating element was started, and the temperature of the central portion of the reagent was confirmed to have reached a predetermined temperature before introducing the gas to be treated. During the reaction, the current applied to the tubular furnace was controlled so that the temperature measured by a thermocouple inserted in the central portion of the reagent (portion which had the highest temperature in the bulk of the reagent) was held at the predetermined temperature. The temperature having been held during the reaction is referred to as the reaction temperature.

Part of the gas exhausted from the reaction tube was sampled, and introduced into a gas analyzer as shown in FIG. 1. The remainder of the exhaust gas was passed through a fluorine-absorbing bottle containing a solution of sodium hydroxide, and discharged outside the system. Analysis of the exhaust gas was carried out for sulfur fluoride, other fluorine compounds, $O_2$, $SO_2$, $CO_2$ and CO.

Table 2 shows the results of decomposing sulfur hexafluoride under the conditions mentioned above using the reagent A or B while the reaction temperature and the superficial velocity were varied. The decomposition ratio of $SF_6$ shown in Table 2 is one determined 30 minutes after starting the reaction. Sulfur fluoride remaining in the exhaust gas was measured in a sample obtained from the exhaust gas 30 minutes after starting the reaction. The decomposition ratio was represented by a percentage of sulfur fluoride in the exhaust gas based on sulfur fluoride in the gas to be treated.

TABLE 2

| Test No. | Comp. of gas to be treated | | Reaction temp. ° C. | Reaction time hr | Sup$^+$ velocity 1/hr | Decomposition ratio of $SF_6$ % | By-products | |
|---|---|---|---|---|---|---|---|---|
| | $SF_6$ % | $O_2$ % | | | | | $SO_2$ ppm | $CF_4$ % |
| 21* | 5 | 5 | 350 | 0.5 | 146 | ≥99.7 | ≥2000 | ≤0.002 |
| 22* | 5 | 5 | 400 | 0.5 | 146 | ≥99.9 | ≤1 | ≤0.002 |
| 23* | 5 | 5 | 600 | 0.5 | 146 | ≥99.9 | ≤1 | ≤0.002 |
| 24* | 5 | 5 | 600 | 0.5 | 291 | ≥99.9 | ≤1 | ≤0.002 |
| 25* | 5 | 5 | 700 | 0.5 | 146 | ≥99.9 | ≤1 | ≤0.002 |
| 26* | 5 | 5 | 800 | 0.5 | 146 | ≥99.9 | ≤1 | ≤0.002 |
| 27* | 5 | 0 | 450 | 0.5 | 291 | ≥99.9 | ≤1 | ≤0.002 |
| 28* | 5 | 0 | 750 | 0.5 | 291 | ≥99.9 | ≤1 | ≤0.002 |
| 29* | $SF_6$ 2 $CF_4$ 3 | 5 | 750 | 0.5 | 146 | ≥99.9 $SF_6 + CF_4$ | ≤1 | ≤0.002 |
| 31# | 5 | 5 | 400 | 0.5 | 146 | 30 | 35 | ≤0.002 |
| 32# | 5 | 5 | 450 | 0.5 | 146 | ≥95.3 | ≥2000 | ≤0.002 |
| 33# | 5 | 5 | 500 | 0.5 | 146 | ≥99.9 | ≤1 | ≤0.002 |
| 34# | 5 | 5 | 600 | 0.5 | 146 | ≥99.9 | ≤1 | ≤0.002 |
| 35# | 5 | 5 | 700 | 0.5 | 146 | ≥99.9 | ≤1 | ≤0.002 |
| 34# | 5 | 5 | 700 | 0.5 | 291 | ≥99.9 | ≤1 | ≤0.002 |
| 35# | 5 | 5 | 800 | 0.5 | 146 | ≥99.9 | ≤1 | ≤0.002 |

Note:
*Reagent A containing K
Reagent B containing no K
$^+$Sup = Superficial

The following conclusions can be drawn from the results of Table 2. $SF_6$ was decomposed at reaction temperatures of 300° C. or more in all of the tests. When the reagent A containing K was used, the percent decomposition become 99.7% or more at reaction temperatures of 350° C. or more. When the reagent B containing no K was used, the decomposition ratio becomes 95.3% or more at reaction temperatures of 450° C. or more. That is, in all of the tests, $SF_6$ was decomposed at a percent age of decomposition near 100%.

It is understood from the relationship between reaction temperatures and by-products in the table that under the reaction conditions, formation of $SO_2$ is observed at temperatures of up to 350° C. when the reagent A containing K is used, and at temperatures of up to 450° C. when the reagent B containing no K is used, and that no test examples show generation of $CF_4$.

What is claimed is:

1. A method for decomposing nitrogen fluoride and/or sulfur fluoride, comprising contacting at least one of gaseous nitrogen fluoride and gaseous sulfur fluoride with a pelletized reagent containing elemental carbon and one or more of the alkaline earth metal component.

2. The method according to claim 1, wherein said alkaline earth metal component comprises calcium or magnesium and is incorporated in said reagent in the form of an oxide, hydroxide and/or carbonate thereof.

3. The method according to claim 1, wherein said elemental carbon is incorporated in said reagent in the form of charcoal, activated carbon, carbon black or coke powder.

4. The method according to claim 3, wherein said reagent further comprises one or more of an alkali metal component.

5. The method according to claim 4, wherein the content proportion in terms of the atomic ratio of said alkaline earth metal element to said elemental carbon to said alkali metal element is in a range of 1:0.25–4.0:0–0.3.

6. The method according to claim 4, wherein said alkali metal component comprises potassium and is incorporated in said reagent in the form of a hydroxide, carbonate, phosphate, aluminate, nitrate and/or sulfate thereof.

7. The method according to claim 1, wherein gaseous nitrogen fluride is contacted with said reagent at a temperature of not lower than 200° to decompose the nitrogen fluoride.

8. The method according to claim 7, wherein the temperature of said contact between said nitrogen fluoride and said reactant is selected to be up to 450° C. to prevent by-production of carbon fluoride.

9. The method according to claim 7, wherein said temperature of said contact between said nitrogen fluoride and said reagent is selected to be not lower than 700° C. to prevent by-production of carbon fluoride.

10. The method according to claim 7, wherein said reagent contains an alkali metal component, and the temperature of said contact between the nitrogen fluoride and said reagent is selected to be not less than 350° C. to prevent by-production of nitrogen oxide.

11. The method according to claim 1, wherein gaseous sulfur fluoride is contacted with said reagent at a temperature of not lower than 300° C. to decompose the sulfur fluoride.

12. The method according to claim 11, wherein the temperature of said contact between the sulfur fluoride and said reagent is selected to be not less than 450° C. to prevent by-production of sulfur oxide.

13. The method according to claim 11, wherein said reagent further comprises an alkali metal component, and the temperature of said contact between the sulfur fluoride and said reagent is selected to be not lower than 350° C. to prevent by-production of sulfur oxide.

* * * * *